(12) United States Patent
Malka (10) Patent No.: US 10,379,363 B2
(45) Date of Patent: Aug. 13, 2019

(54) SYSTEM AND METHOD FOR CONTROLLING PLATFORM MOUNTED DEVICES

(71) Applicant: Elbit Security Systems Ltd., Sderot (IL)

(72) Inventor: Yitzhak Malka, Sderot (IL)

(73) Assignee: Elbit Security Systems Ltd., Sderot (IL)

( * ) Notice: Subject to any disclaimer, the term of this patent is extended or adjusted under 35 U.S.C. 154(b) by 15 days.

(21) Appl. No.: 14/895,213

(22) PCT Filed: Jun. 3, 2014

(86) PCT No.: PCT/IL2014/050502
§ 371 (c)(1),
(2) Date: Dec. 2, 2015

(87) PCT Pub. No.: WO2014/195947
PCT Pub. Date: Dec. 11, 2014

(65) Prior Publication Data
US 2016/0116747 A1    Apr. 28, 2016

(30) Foreign Application Priority Data

Jun. 3, 2013 (IL) .......................................... 226701

(51) Int. Cl.
*G02B 27/01* (2006.01)
*G05B 15/02* (2006.01)

(52) U.S. Cl.
CPC ....... *G02B 27/0176* (2013.01); *G02B 27/017* (2013.01); *G05B 15/02* (2013.01); *G02B 2027/0156* (2013.01); *G02B 2027/0163* (2013.01)

(58) Field of Classification Search
CPC .............. G02B 27/0176; G02B 27/017; G02B 2027/0163; G02B 2027/0156; G05B 15/02
See application file for complete search history.

(56) References Cited

U.S. PATENT DOCUMENTS

| | | |
|---|---|---|
| 5,637,931 A | 6/1997 | Hsu |
| 6,087,660 A | 7/2000 | Morris et al. |
| 6,377,401 B1 | 4/2002 | Bartlett |

(Continued)

OTHER PUBLICATIONS

International Search Report of PCT Application No. PCT/IL2014/050502, dated Sep. 18, 2014.

(Continued)

*Primary Examiner* — Robert E Fennema
*Assistant Examiner* — Marzia T Monty
(74) *Attorney, Agent, or Firm* — Pearl Cohen Zedek Latzer Baratz LLP (57) ABSTRACT

A system for controlling a platform mounted devices which includes an orientation sensor configured to sense orientation of the platform mounted device relative to an earth leveled frame of reference; and a processor configured to: create a sector relative to the earth leveled frame of reference, receive from said orientation sensor an indication about orientation of said mounted device, analyze orientation versus the created sector, decide whether the device is within a pre-decided portion of the sector, and generate a control command according to the decision.

21 Claims, 4 Drawing Sheets

(56) References Cited

U.S. PATENT DOCUMENTS

| | | |
|---|---|---|
| 7,658,824 B2 | 2/2010 | Bremauer |
| 8,340,908 B2 | 12/2012 | Hess et al. |
| 2007/0057068 A1* | 3/2007 | Tsai ...................... G06F 1/1626 235/472.01 |
| 2010/0240988 A1* | 9/2010 | Varga ................... G02B 27/017 600/425 |
| 2010/0283412 A1* | 11/2010 | Baudou ................ A42B 3/0433 315/307 |
| 2011/0028966 A1 | 2/2011 | Lau et al. |
| 2011/0289661 A1* | 12/2011 | Hammond ........... A42B 3/0433 2/422 |
| 2013/0040653 A1* | 2/2013 | Czompo .............. G01C 21/165 455/456.1 |

OTHER PUBLICATIONS

Office Action of IL Patent Application No. 226701, dated Feb. 9, 2014.

* cited by examiner

SYSTEM AND METHOD FOR CONTROLLING PLATFORM MOUNTED DEVICES

CROSS-REFERENCE TO RELATED APPLICATIONS

This application is a National Phase Application of PCT International Application No. PCT/IL2014/050502, International Filing Date Jun. 3, 2014, entitled "SYSTEM AND METHOD FOR CONTROLLING PLATFORM MOUNTED DEVICES", published on Dec. 11, 2014 as International Patent Application Publication No. WO 2014/195947, claiming priority of Israel Patent Application No. 226701, filed Jun. 3, 2013, which is incorporated herein by reference in its entirety.

FIELD OF THE INVENTION

The present invention relates generally to platform mounted devices, and more particularly, to such devices whose operation is controlled with respect to their orientation.

BACKGROUND OF THE INVENTION

Platform mount devices such as night vision goggles or other vision improvement tools are used for military and/or security missions. Usually, such devices consume power and require illumination units to illuminate the environment in front of a user such as, for example, a soldier carrying the device. Other platform mounted devices may include, for example, hand held devices and sights attached to a weapon being the platform.

Such mount devices may be used alternately, wherein a user may, for example, slide the device in front of his eyes for using the device and slide it back up when finished using with the device. In order to save energy, some known methods, for example which use magnetic and/or mechanic actuators, enable automatic shutting of the device when the device is up. Additionally, automatic shutting may be required in order to avoid enemy detection of the user because of the illumination units of the device that may cast light as long as the device is operating.

However, most of the known methods are limited to certain mechanical arrangement of the device and to a certain manner of connection of the device. Particularly, most of the known methods are limited to devices that may vertically tilt up or down, above the user's field of view or into the user's field of view, respectively. In such arrangements, a simple mechanical sensor may detect when the device is up or down.

None of the known methods may detect location and orientation of a device with illuminating capabilities relative to a platform regardless the certain mechanical arrangement of the device or manner of connection of the device to the platform.

SUMMARY OF THE INVENTION

Embodiments of the present invention may provide a system for controlling a platform mounted devices which includes an orientation sensor configured to sense orientation of the platform mounted device relative to the platform; and a processor configured to: create a sector relative to a horizon, receive from said orientation sensor an indication about orientation of said mounted device, analyze orientation versus the created sector, decide whether the device is within a pre-decided portion of the sector, and generate a control command according to the decision.

In some embodiments, the location sensor may be replaced with an orientation sensor configured to sense an orientation of the platform mounted device relative to an earth leveled frame of reference (the horizon being a non-limiting example of an earth leveled frame of reference).

In some embodiments, the processor may be configured to create at least one sector relative to said earth leveled frame of reference, wherein said at least one sector is defined by at least one of: a range of vertical angles, and a range of horizontal angles. In other words, the sector is a subset of the sphere and can be limited by either vertical (tilt) or horizontal (pan) angles or a combination thereof.

The mounted device may be moveable relative to a head when mounted onto a head, and the location sensor (or orientation sensor) may continuously sense location of the device relative to the head. The location sensor may be able to sense at least one form of movement of a list including: vertical tilt, horizontal tilt, sliding or rotational sliding, pitch or roll. The location sensor may be embedded within and/or installed on the head mounted device.

The system according to some embodiments of the present invention may be installed on or embedded within the head mounted device. In some embodiments, at least one of the location sensor and processor are detached from the head mounted device. For example, at least one of the location sensor and processor may be included in a unit having wireless communication abilities.

In some embodiments, the processor may control the device based on the generated command and/or may send the generated command to a controller or actuator of the head mounted device. In other embodiments, the system may include an indication module to generate an indication to a user based on the control command.

Additionally, a method according to embodiments of the present invention may include sensing by the location sensor at least one form of movement of a list including: vertical tilt, horizontal tilt, sliding or rotational sliding, pitch or roll.

Additionally, a method according to embodiments of the present invention may include sending the generated command to a controller or actuator of the head mounted device. The receiving of an indication about location of a head mounted device and the sending of the generated command may be performed, in some embodiments, by wireless communication.

Additionally, a method according to embodiments of the present invention may include generating by an indication module an indication to a user based on the control command.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention, in embodiments thereof, provides a system for controlling a platform mounted devices. Platform mounted devices, for the purpose of the embodiments of the present invention may include laser systems, optical markers, hand held devices, head mounted devices, firearm sights and any active device that is attached to a platform and may change its orientation relative to the platform. Embodiments of the present invention are configured to alter the operative state of the platform mounted device in a predefined geometric sector that corresponds with specific boundaries. In embodiments of the present invention, these boundaries are relative to the platform and not absolute by nature.

Embodiments of the present invention may include an orientation sensor configured to sense orientation of the platform mounted device relative to the platform; and a processor configured to: (a) create a sector relative to a horizon, (b) receive from said orientation sensor an indication relating to the orientation of said mounted device, (c) analyze the orientation versus the created sector, (d) decide whether the device is within a pre-decided portion of the sector, and (e) generate a control command according to the decision.

In some embodiments, more than one sector is being created. The sector may be defined as a range of horizontal angles and a range of vertical angles. The sector may be defined relative to an absolute frame of reference, and not necessarily to the horizon being a non-limiting example.

Figure 1:
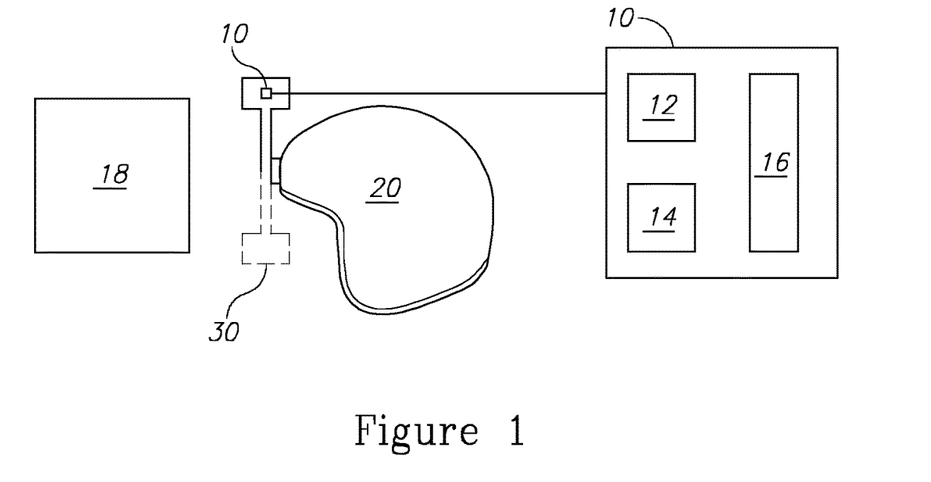
FIG. 1, which is a schematic illustration of a system for controlling mount devices according to embodiments of the present invention.

In the following description, a head mounted device (such as a helmet having an illuminating source) is described by way of example. It is understood however, that embodiments of the present invention should not be regarded as limited by any way to head mounted devices. Other platform mounted devices may benefit from the embodiments of the present invention as discussed above. Reference is now made to FIG. 1, which is a schematic illustration of a system 10 for controlling mount devices according to embodiments of the present invention. System 10 may include a processor/controller 12, a memory 14 and a location sensor 16. Some or all the elements of system 10 may be embedded within and/or installed on a head mounted device 30, which may be mountable on a head by a headgear 20 which may include a helmet, head straps, or by any other suitable method. Additionally, system 10 may include a detached unit 18 which may include, in some embodiments, at least one of the elements of system 10 such as, for example, processor/controller 12, a memory 14 and a location sensor 16. Detached unit 18 and/or system 10 may include wireless communication abilities and/or may be able to communicate with a controller/actuator of device 30. Head mounted device 30 may include, for example, a night vision device, goggles and/or any other vision improvement and/or assistance device. Location sensor 16 may sense location of device 30. Location sensor 16 may include, for example, a motion sensor, an acceleration sensor, an accelerometer, an inclination sensor, an inclinometer, an image sensor, or any other suitable sensor, which may be embedded, for example, as a Micro-Electro-Mechanical system (MEMS). For example, an inclinometer sensor that may use an acceleration component as a factor. Such a device may be economic and efficient from the aspects of space and power consuming and performance.

In some embodiments of the present invention, location sensor 16 may be embedded within or installed on device 30. Head mounted device 30 may be moveable relative to a head, e.g. relative to headgear 20 when mounted onto a head. Location sensor 16 may be configured to continuously and/or periodically sense location of device 30 relative to headgear 20. Location sensor 16 may be configured to sense various forms of movement (for example, acceleration) or at least one form of movement such as, for example, vertical tilt, horizontal tilt, sliding and rotational sliding, pitch, roll, and/or any other suitable form of movement.

In other embodiments, for example in cases where location sensor 16 may be detached from device 30, location sensor 16 may include an image sensor that may detect location of device 30 by image processing methods.

Figure 2:
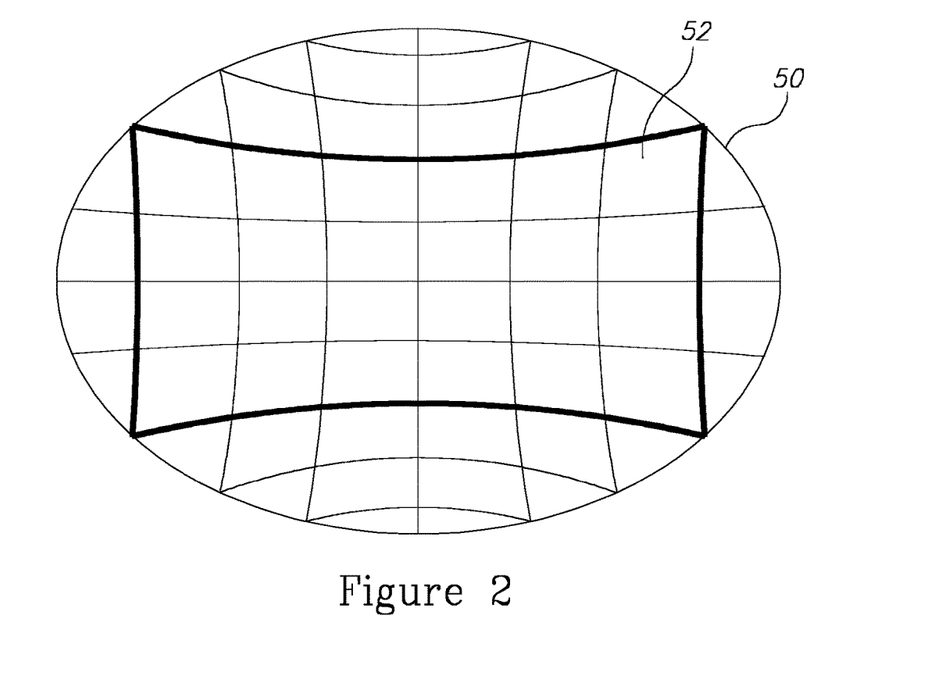
FIG. 2 is an illustration from within the space enclosed by the sphere, a portion of a virtual field of view (FOV) sphere created by a processor according to embodiments of the present invention.

Processor/controller 12 may calculate a virtual field of view (FOV) sphere, for example, sphere 50 shown in FIG. 2. FIG. 2 is an illustration from within the space enclosed by sphere 50, a portion of a virtual field of view (FOV) sphere 50 created by processor 12 according to embodiments of the present invention. Sphere 50 may constitute, for example, of a collection of points in a certain constant distance from a headgear 20. For example, all possible locations of device 30 may be within the space enclosed by the calculated virtual FOV sphere 50. Accordingly, processor/controller 12 may create a virtual FOV sphere 50 relative to a head position, for example by calculating a virtual FOV sphere 50 surrounding headgear 20 that may include within the enclosed space all the possible locations of device 30.

Processor 12 may receive from location sensor 16 an indication about location of head mounted device 30. Than, processor 12 may analyze the relative location of device 30 versus the created virtual FOV sphere. For example, processor 12 may divide the virtual sphere into spherical sectors and detect in which spherical sector of the virtual sphere device is located. According to the analysis, processor 12 may decide whether the device is within a pre-decided portion of the virtual FOV sphere, e.g. a certain pre-decided sector 52 of the virtual sphere, and generate a control command according to the decision. For example, when device 30 is outside a certain predetermined portion 52 of the virtual sphere, processor 12 may generate a control command to shut down device 30, or to indicate to a user that device 30 should be shut down. A predetermined portion 52 of the virtual sphere may include and/or represent, for example, a field of view of a user, on whose head device 30 may be mounted. Accordingly, whenever device 30 is not within the user's field of view, processor 12 may generate a command to shut down the device. In case the device is already shut down, the processor may keep the device shut, for example by not generating a control command to shut the device down. When device 30 is within the predetermined portion 52 of the virtual, for example, within the field of view of the user, processor 12 may keep the device in operational mode, for example, by not generating a shutting command, or may generate a command to turn the device on in case the device is off.

Communications to or from processor 12, such as, for example, receiving from sensor 16 an indication about location of device 30 or sending of the generated command may be performed by wireless communication.

The virtual sphere 50 may be created by processor 12 periodically or upon detection of movement by location sensor 16. A created virtual sphere 50 may be stored in memory 14 to be used by processor 12 for the analyses of relative location of device 30. The location of device 30 may be sensed by sensor 16, for example, periodically and the location indicated by sensor 16 may be stored in memory 14.

Memory 14 may include an article such as a computer or processor readable non-transitory storage medium, such as for example a memory card, a disk drive, or a USB flash memory encoding, including or storing instructions, e.g., computer-executable instructions, such as, for example, application/software items downloaded from an application server. When executed by a processor or controller such as processor 12, the instructions stored and/or included in memory 14 may cause the processor or controller to carry out methods disclosed herein.

In some embodiments, processor/controller 12 is configured to control device 30 based on the generated command. In other embodiments, processor/controller 12 may send the generated command to a controller or actuator (not shown) of device 30. In further other embodiments, processor/controller 12 or an indication module (not shown) of system 10 may generate an indication to a user based on the generated command, such as, for example, a vocal or visual indication, for example to indicate for a user that device 30 should be shut off or should be turned on. In some embodiment, system 10 may be set to a manual mode, in which the user turns device 30 on and off manually. In some embodiments, system 10 may be set to a half-automatic mode, in which the shutting off is performed automatically by processor 12 or a controller receiving a command from processor 12, and initiation of the device may be performed manually. Additionally, in case device 30 is a night vision device, system 10 may include a light sensor (not shown) to decide when device 30 should be shut down, for example when the illumination level is above a certain threshold.

Figure 3A:
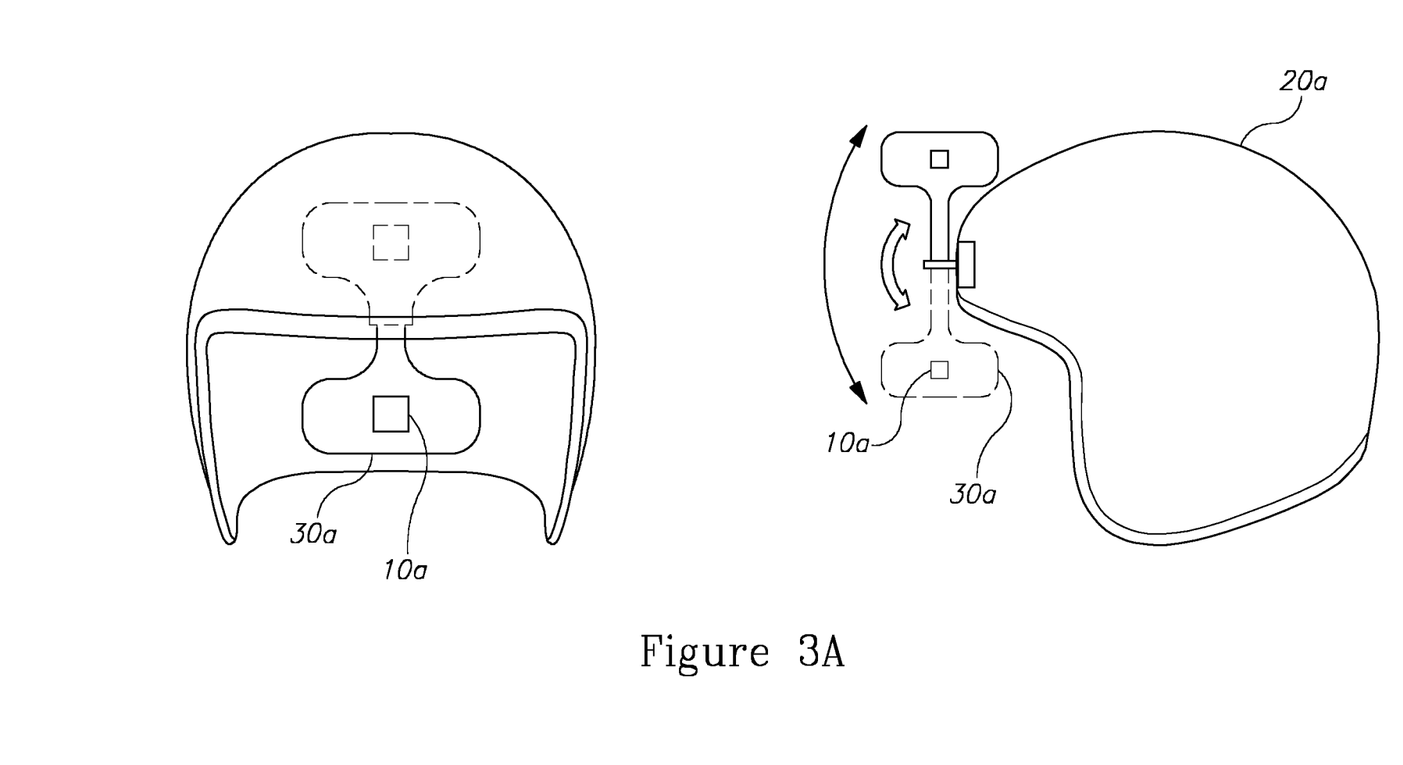
FIGS. 3A-3C are schematic illustrations of exemplary various kinds of head mount devices.
Figure 3B:
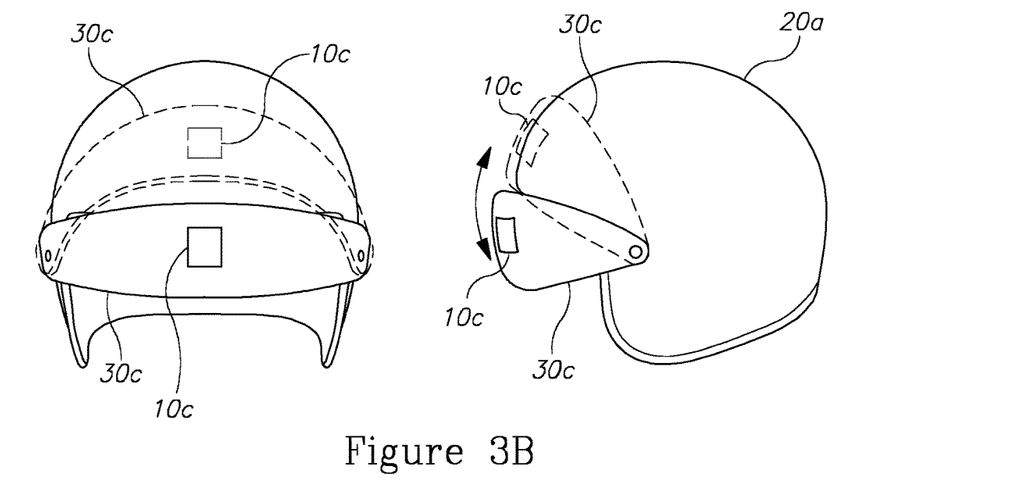
Figure 3C:
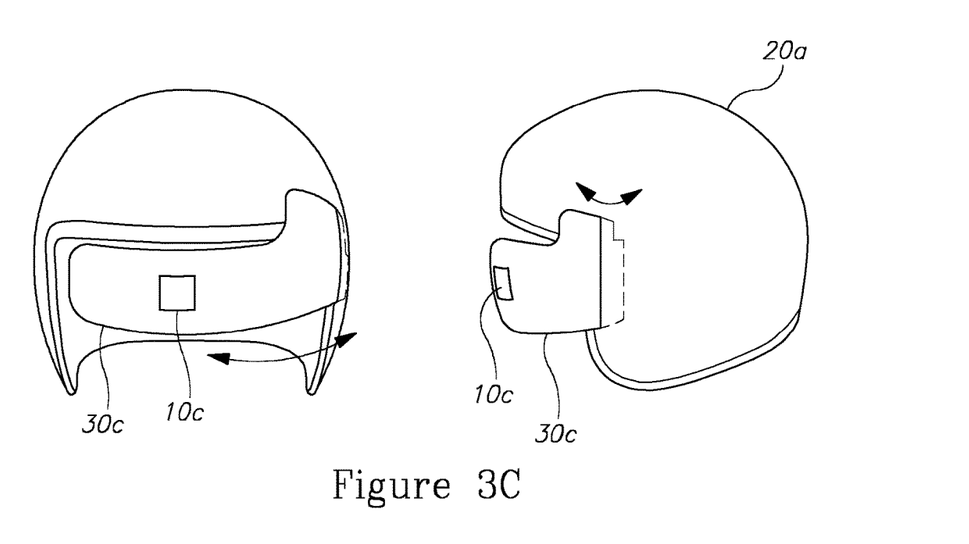

As mentioned above, location sensor 16 may be configured to sense various forms of movement or at least one form of movement such as, for example, vertical tilt, horizontal tilt, sliding and rotational sliding, pitch, roll, and/or any other suitable form of movement. As shown in FIGS. 3A-3C, various kinds of head mount devices, such as the exemplary devices 30a, 30b, 30c or any alternative kind that may not be shown in one of the Figures, may be moveable relative to headgears 20a, 20b or 20c in various different manners. For example, as shown in FIG. 3A, device 30a may be tilted or rolled up above a user's field of view and down into a user's field of view. As shown in FIG. 3B, device 30b may be pitched up above a user's field of view and down into a user's field of view. As shown in FIG. 3C, device 30c may be tilted horizontally out from a user's field of view and into a user's field of view. For any form of movement, a location sensor such as sensor 16 within system 10a, 10b or 10c may sense the location of the head mounted device.

Figure 4:
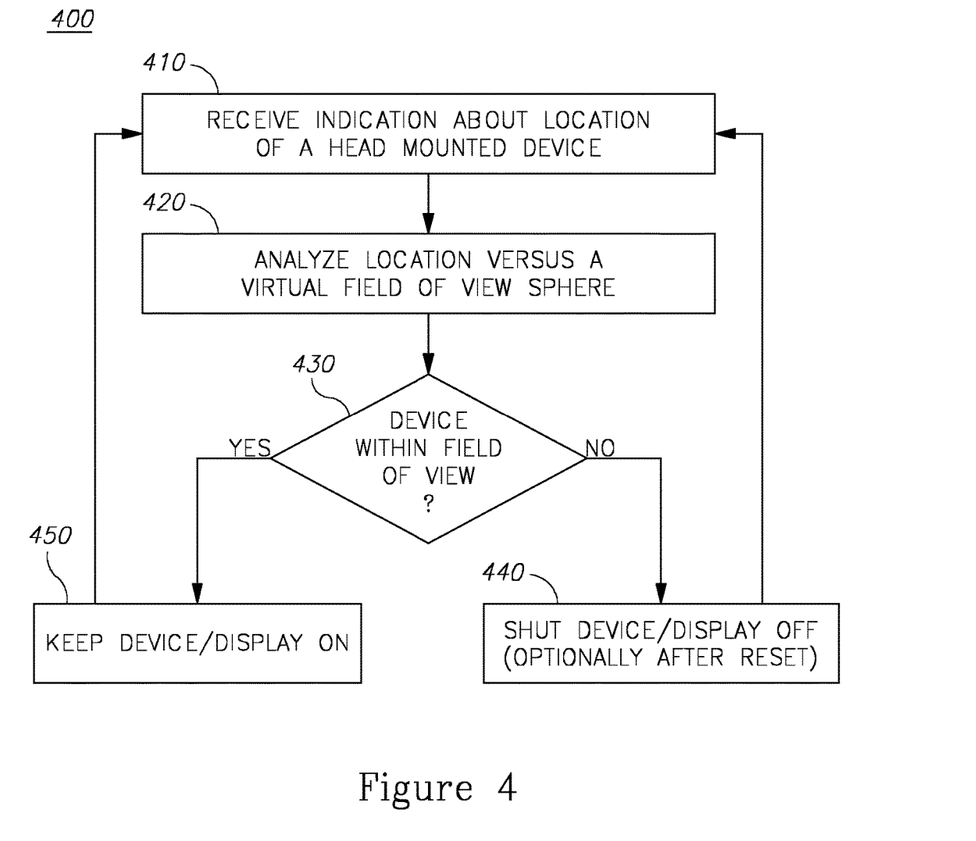
FIG. 4 is a schematic flowchart illustrating a method for controlling head mount devices according to embodiments of the present invention.

Reference is now made to FIG. 4, which is a schematic flowchart illustrating a method for controlling head mount devices according to embodiments of the present invention. As indicated in block 410, the method may include receiving indication about location of a head mounted device.

The indication may be received by processor 12 from location sensor 16, for example as described herein. As indicated in block 420, the method may include analyzing location versus a virtual field of view (FOV) sphere created by processor 12 relative to a head position, for example as described herein. As indicated in block 430, the method may include deciding whether the device is within a pre-decided portion 52 of the virtual FOV sphere 50 such as, for example, a field of view of a user wearing headgear 20, for example as described herein. Based on the decision, processor 12 may generate a control command according to the decision, for example as described herein. In case device 30 is outside the pre-decided portion 52, as indicated in block 440, the processor may generate a command to shut the device off or keep the device shut off. In case device 30 is within the pre-decided portion 52, processor 12 may generate a command to keep the device on or turn the device on.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for controlling a platform mounted device comprising:
   at least one orientation sensor configured to sense an orientation of the platform mounted device versus an earth leveled frame of reference; and
   a processor configured to:
   (a) create at least one sector versus said earth leveled frame of reference, wherein said at least one sector is defined by at least one of: a range of vertical angles, and a range of horizontal angles;
   (b) receive from said at least one orientation sensor, an indication relating to the orientation of said mounted device;
   (c) analyze the orientation versus the created at least one sector;
   (d) decide whether the device is within a pre-decided portion of the sectors; and
   (e) generate a control command capable of controlling said device according to the decision,
   wherein the mounted device is further moveable relative to said platform when mounted onto said platform, and wherein said orientation sensor is configured to continuously or periodically sense location of said device relative to the platform.

2. The system according to claim 1, wherein the control command comprises automatically altering an operative state of the device in correspondence with said platform being within or outside of said pre-decided portion.

3. The system according to claim 1, wherein the control command comprises altering an operative state of the device in correspondence with said platform being within or outside of said pre-decided portion responsive to an input from a user.

4. The system of claim 1, wherein said orientation sensor is configured to sense at least one form of movement of a list comprising: vertical tilt, horizontal tilt, sliding or rotational sliding, pitch or roll.

5. The system of claim 1, wherein the orientation sensor is embedded within the mounted device.

6. The system of claim 1, wherein the orientation sensor is installed on said mounted device.

7. The system of claim 1, wherein the system is installed on said mounted device.

8. The system of claim 1, wherein the system is embedded within said mounted device.

9. The system of claim 1, wherein said processor is configured to send said generated command to a controller or actuator of the mounted device.

10. The system of claim 1, comprising an indication module to generate an indication to a user based on said control command.

11. The system of claim 1, wherein at least one of said orientation sensor and processor are detached from said mounted device.

12. The system of claim 1, wherein at least one of said orientation sensor and processor is comprised in a unit having wireless communication abilities.

13. A method for controlling a platform mounted device comprising:
sensing an orientation of the platform mounted device versus an earth leveled frame of reference;
creating at least one sector versus said earth leveled frame of reference, wherein said at least one sector is defined by at least one of: a range of vertical angles, and a range of horizontal angles;
analyzing the orientation versus the created sector;
deciding whether the device is within a pre-decided portion of the at least one sector; and
generating a control command capable of controlling said device according to the decision,
wherein the device is further moveable relative to said platform when mounted onto said platform, and
wherein the sensing includes continuously or periodically sensing a location of said device relative to the platform.

14. The method according to claim 13, wherein the control command comprises automatically altering an operative state of the device in correspondence with said platform being within or outside of said pre-decided portion.

15. The method according to claim 13, wherein the control command comprises altering an operative state of the device in correspondence with said platform being within or outside of said pre-decided portion responsive to an input from a user.

16. The method of claim 13, wherein the sensing is of a form of a movement of a list comprising: vertical tilt, horizontal tilt, sliding or rotational sliding, pitch or roll.

17. The method of claim 13, wherein the sensing is carried out within the mounted device.

18. A system for controlling a platform mounted device comprising:
at least one sensor configured to sense a relative location of said platform mounted device versus a virtual field of view, wherein said virtual field of view comprises an enclosed space including all possible locations of said platform mounted device; and
a processor configured to:
(a) divide said virtual field of view into a plurality of sectors;
(b) receive from said at least one sensor, an indication relating to the relative location of said platform mounted device versus said virtual field of view;
(c) analyze the relative location of said platform mounted device versus said virtual field of view and detect in which of said plurality of sectors said platform mounted device is located;
(d) decide whether said platform mounted device is within a pre-decided sector, said pre-decided sector being one of said plurality of sectors; and
(e) generate a control command capable of controlling said platform mounted device according to the decision,
wherein said platform mounted device is further mounted onto and moveable relative to a platform, and wherein said at least one sensor is configured to continuously or periodically sense the relative location of said platform mounted device versus said virtual field of view.

19. A method for controlling a platform mounted device comprising:
sensing a relative location of said platform mounted device versus a virtual field of view, wherein said virtual field of view comprises an enclosed space including all possible locations of said platform mounted device;
dividing said virtual field of view into a plurality of sectors;
analyzing the relative location of said platform mounted device versus said virtual field of view and detecting in which of said plurality of sectors said platform mounted device is located;
deciding whether said platform mounted device is within a pre-decided sector, said pre-decided sector being one of said plurality of sectors; and
generating a control command capable of controlling said platform mounted device according to the decision,
wherein said platform mounted device is further mounted onto and moveable relative to a platform, and
wherein the sensing includes continuously or periodically sensing the relative location of said platform mounted device versus said virtual field of view.

20. A system for controlling a platform mounted device comprising:
at least one orientation sensor configured to sense an orientation of the platform mounted device relative to a virtual field of view, wherein said virtual field of view comprises a collection of points a constant distance from said platform; and
a processor configured to:
(a) divide said virtual field of view into at least one sector, wherein said at least one sector is defined by at least one of: a range of vertical angles, and a range of horizontal angles;
(b) receive from said at least one orientation sensor, an indication relating to the orientation of said mounted device;
(c) analyze the orientation versus the at least one sector;
(d) decide whether the device is within a pre-decided portion of the sectors; and
(e) generate a control command capable of controlling said device according to the decision,
wherein the mounted device is further moveable relative to said platform when mounted onto said platform, and wherein said orientation sensor is configured to continuously or periodically sense location of said device relative to the platform.

21. A method for controlling a platform mounted device comprising:
sensing an orientation of the platform mounted device relative to a virtual field of view, wherein said virtual field of view comprises a collection of points a constant distance from said platform;
dividing said virtual field of view into at least one sector, wherein said at least one sector is defined by at least one of: a range of vertical angles, and a range of horizontal angles;
analyzing the orientation versus the at least one sector;
deciding whether the device is within a pre-decided portion of the at least one sector; and
generating a control command capable of controlling said device according to the decision,
wherein the device is further moveable relative to said platform when mounted onto said platform, and
wherein the sensing includes continuously or periodically sensing a location of said device relative to the platform.

* * * * *